UNITED STATES PATENT OFFICE.

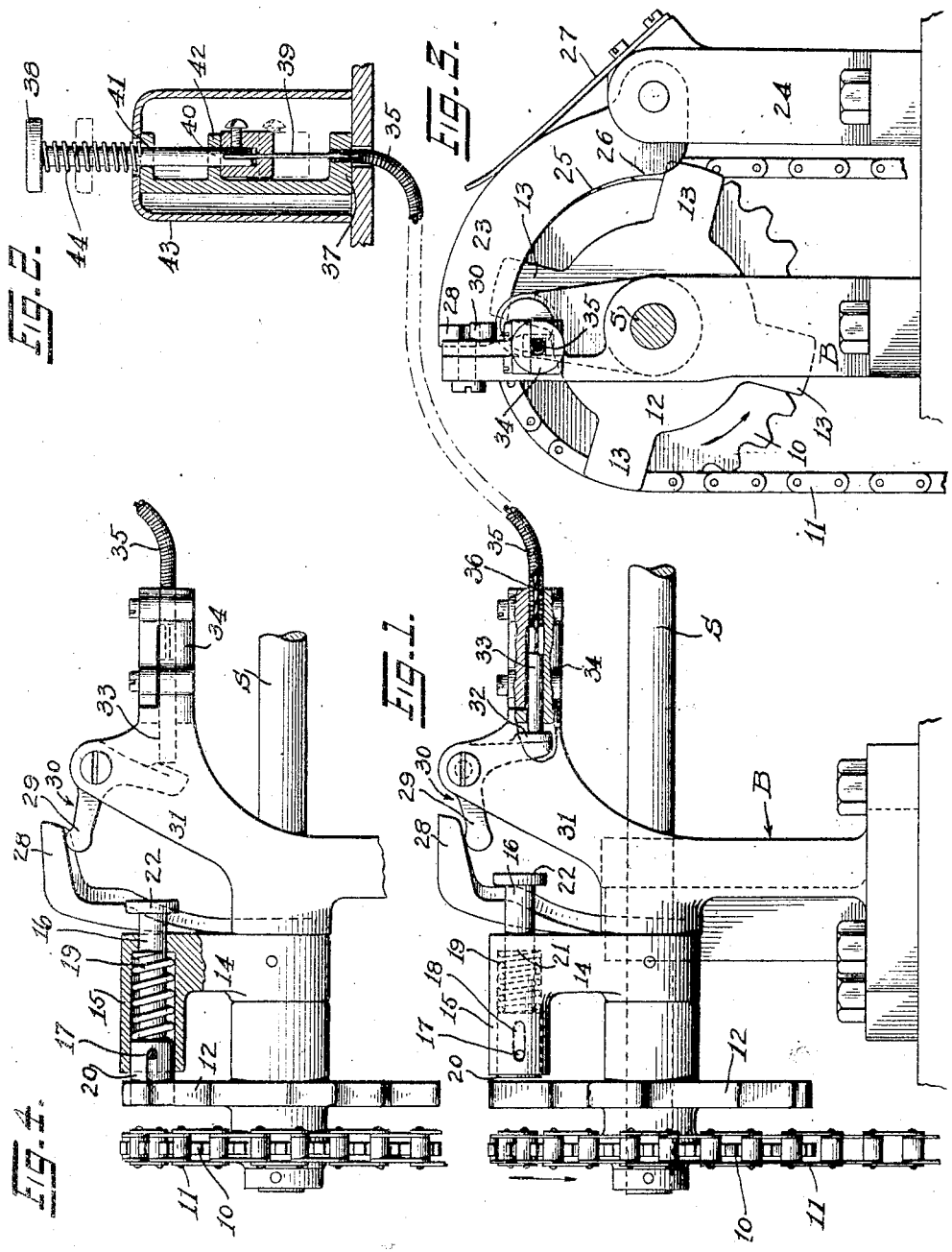

WILLIAM W. LASKER, OF BROOKLYN, NEW YORK, ASSIGNOR TO POWERS ACCOUNTING MACHINE COMPANY, OF NEW YORK, N. Y., A CORPORATION OF DELAWARE.

CONTROLLING MEANS.

1,352,006.　　　　Specification of Letters Patent.　　Patented Sept. 7, 1920.

Application filed August 26, 1916. Serial No. 116,958.

*To all whom it may concern:*

Be it known that I, WILLIAM W. LASKER, a citizen of the United States, residing in Brooklyn, in the county of Kings and State of New York, have invented certain new and useful Improvements in Controlling Means, of which the following is a specification.

This invention relates to controlling means in general, and more particularly to means for controlling clutches and the like.

One of the main objects of the present invention is to provide a flexible connection between a controlling key and the controllable means of a machine. To this end an arrangement is provided having a flexible casing, a flexible connection reciprocatably mounted therein, a control key at one end of the casing for actuating said flexible connection, and a controllable means operatively connected to the other end of said flexible connection.

These and other features, capabilities and advantages of the invention will appear from the subjoined detail description of one specific embodiment thereof illustrated in the accompanying drawings, in which—

Figure 1 is a fragmental elevational view, partly in section, showing a driving mechanism and a clutch connected to one end of the flexible connection constituting the present invention.

Fig. 2 is a sectional view showing the key for actuating the aforesaid flexible connection.

Fig. 3 is an end view, relative to Fig. 1, showing the driving mechanism, clutch and flexible connection.

Fig. 4 is a view similar to Fig. 1, in which, however, the flexible connection has been actuated to release the clutch.

In the embodiment illustrated there is shown a bearing B in which is journaled the shaft S, having loosely mounted thereon at one end a sprocket wheel 10 which is connected to a suitable source of power (not shown) by the sprocket chain 11. Fixed to travel with the sprocket wheel 10 is the cross-shaped wheel 12, having four arms 13 in the present instance.

Between the wheel 12 and the bearing B, and fixed to the shaft S, is the lever 14 having at its free end a chambered arm 15 to accommodate a pin 16 extending parallel with the shaft S. The pin 16 is anchored in the chambered arm 15 by means of the pin 17 on the arm 15 coöperating with the slot 18 in the pin 16. By means of the spring 19, which is disposed between the enlargement 20 of the pin 16 and the shoulder 21 in the arm 15, the pin 16 is constantly under tension and adapted to have its enlargement 20 extend into the path of movement of the arms 14 by such spring 19. The end of the pin 16 removed from the wheel 12 and extending adjacent to the bearing B is provided with a head 22 to coöperate with the cam lever 23 which is pivotally mounted on the bracket 24 disposed adjacent to the bearing B and of an arcuate shape with a cam face 25. The inner portion 26 of the cam face extends over and beyond the bracket 24 and into the path of movement of the pin 16, and is flexibly maintained in such position by the flat spring 27 secured to the bracket 24 and extending over and engaging the outer convex edge of the lever 23. The face 25, from the portion 26, gradually extends away from the lever 14 and terminates at its upper end in a laterally extending finger 28 extending toward and engaging the upper surface of the upper arm 29 of the bell crank 30 pivotally connected to the extension 31 extending upwardly from the bearing B, the lower arm 32 of which bell crank 30 extends into the path of movement of the pin 33 slidably mounted in the member 34 extending laterally from such extension 31. The bore of the member 34 is diminished at its outer end to prevent the displacement of the pin 33. In such diminished end is secured one end of the casing 35 for the flexible connection or cable 36, which is secured to the pin 33, the other end of which cable is secured to the support 37 for the control key 38. The cable 36 extends from the pin 33 almost to the outer end of the casing 35 adjacent to the key support 37 and coöperates at such key control end of the cable 36 with the rigid wire 39 secured to the lower end of the stem 40 on which the key 38 is mounted. The stem 40 is guided in the parallel plates 41 and 42 supported by the housing 43 extending upward from the support 37 and is normally positioned with its key 38 in elevation, so held by the spring 44 disposed between the plate 41 and the key 38.

The operation of the foregoing is substantially as follows: Whenever it is desired to connect the shaft S with the driving sprocket wheel 10, it is only necessary to depress the key 38 whereupon the arm 29 will be actuated to raise the arm 28 out of the way of the head 22 to permit the enlargement 20 of the pin 16 to extend into the path of movement of the arms 13 and thus permit the lever 14 and shaft S to be rotated with the wheel 12. This rotation, however, will only continue one revolution, since when the pin 16 reaches the portion 26 of the lever 23, the head 22 will be engaged by the lever 23 and coöperate with the lever 23 to gradually draw the pin 16 out of engagement with the wheel 12.

As soon as the key 38 is released, the spring 27 will be of sufficient strength to depress the lever 23 and thereby to return the bell crank 30 and the cable 36.

It is obvious that various changes and modifications may be made to the details of construction without departing from the general spirit of the invention.

I claim:—

1. In a device of the character described, the combination of a support; a bearing on said support; a shaft rotatable in said bearing; a driving means loosely mounted on said shaft and provided with projections; a lever fixed on said shaft; a locking member movably carried on said lever and yieldably pressed into the path of said projections; a cam fulcrumed on said support and yieldably moved into the path of said member and adapted on the rotation of said lever to withdraw the locking member out of the path of movement of said projections; a bell crank freely movable and adapted to move said cam from the path of said member; a control key; a flexible connection connected to said control key and operable to actuate said bell crank, and a spring for yieldably retaining said control key in inactive position and for withdrawing said control key and the thereto connected flexible connection out of bell crank actuating position.

2. In a device of the character described, the combination of a stationary support; a bearing on said support; a shaft rotatable in said bearing; a driving means loosely mounted on said shaft and provided with projections; a lever fixed on said shaft; a locking member movably carried on said lever and yieldably pressed into the path of said projections and provided with a shoulder; a cam fulcrumed on said support and yieldably moved into the path of said shoulder and adapted on the rotation of said lever to withdraw the locking member out of the path of movement of said projections; a bell crank adapted to move said cam from the path of said shoulder; a control key; and a flexible connection connected to said control key and operable to actuate said bell crank, and a spring for yieldably retaining said control key in inactive position and for withdrawing said control key and the thereto connected flexible connection out of bell crank actuating position.

3. In a device of the character described, the combination of a stationary support; a bearing carried on said support; a shaft rotatable in said bearing; a driving member and a cross-shaped member fixed to each other and loosely mounted on said shaft; a lever fixed on said shaft and provided with a chamber; a pin slidable in said chamber and spring pressed into engagement with the arms of said cross-shaped wheel and provided with a head at the end most remote from said cross-shaped member; a bracket carried on said support; a cam lever pivoted to said bracket and spring pressed into the path of said head and adapted to engage under said head and withdraw the pin from engagement with said arms as said lever revolves; a bell crank freely movable and adapted to engage said cam and move it out of the path of the pin head; a control key; a flexible connection connected to said control key and operable to actuate said bell crank, and a spring for yieldably retaining said control key in inactive position and for withdrawing said control key and the thereto connected flexible connection out of bell crank actuating position.

WILLIAM W. LASKER.

Witnesses:
GUSTAV DREWS,
H. D. PENNEY.